(12) United States Patent
Makino et al.

(10) Patent No.: US 9,431,862 B2
(45) Date of Patent: Aug. 30, 2016

(54) MOTOR

(75) Inventors: Yusuke Makino, Kyoto (JP); Takahiro Hiwa, Kyoto (JP); Shohei Osuga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 600 days.

(21) Appl. No.: 13/990,122

(22) PCT Filed: Jan. 24, 2012

(86) PCT No.: PCT/JP2012/000422
§ 371 (c)(1),
(2), (4) Date: May 29, 2013

(87) PCT Pub. No.: WO2012/102019
PCT Pub. Date: Aug. 2, 2012

(65) Prior Publication Data
US 2013/0249339 A1 Sep. 26, 2013

(30) Foreign Application Priority Data

Jan. 28, 2011 (JP) .................................. 2011-016309

(51) Int. Cl.
*H02K 3/28* (2006.01)
*H02K 23/38* (2006.01)

(52) U.S. Cl.
CPC . *H02K 3/28* (2013.01); *H02K 23/38* (2013.01)

(58) Field of Classification Search
CPC ......... H02K 23/38; H02K 3/28; H02K 23/26; H02K 23/28; H02K 23/30; H02K 23/34
USPC .......................................... 310/204, 234, 233
See application file for complete search history.

(56) References Cited

U.S. PATENT DOCUMENTS

| 6,043,581 A | 3/2000 | Tanaka et al. |
| 6,236,137 B1 | 5/2001 | Tanaka et al. |
| 2007/0069602 A1* | 3/2007 | Ito .......................... H02K 23/30 310/233 |

FOREIGN PATENT DOCUMENTS

| JP | 10-174403 A | 6/1998 |
| JP | 2002-186210 A | 6/2002 |
| JP | 2003-169458 A | 6/2003 |
| JP | 2008-099416 A | 4/2008 |

(Continued)

OTHER PUBLICATIONS

Abe et al., Machine Translation of JP2002186210, Jun. 2002.*

(Continued)

*Primary Examiner* — Quyen Leung
*Assistant Examiner* — Eric Johnson
(74) *Attorney, Agent, or Firm* — Keating & Bennett, LLP

(57) ABSTRACT

A winding structure which is disposed over an armature and a commutator includes an equalizer. The equalizer includes a going portion and a return portion which are wound across one group of teeth through a slot and connected between two identical segments. In a case where an integer number is an expansion value among values which are integer multiples of a value which is acquired by dividing the total number of the slots by the total number of pole pairs, when one group of the teeth having the same total number as the expansion value is given as an element teeth group, the going portion and the return portion are wound across the element teeth group through the slots positioned at both sides of the element teeth group.

5 Claims, 12 Drawing Sheets

(56) References Cited

FOREIGN PATENT DOCUMENTS

| | | |
|---|---|---|
| JP | 2010-22198 A | 1/2010 |
| JP | 2010-41827 A | 2/2010 |

OTHER PUBLICATIONS

Official Communication issued in International Patent Application No. PCT/JP2012/000422, mailed on Apr. 17, 2012.

* cited by examiner

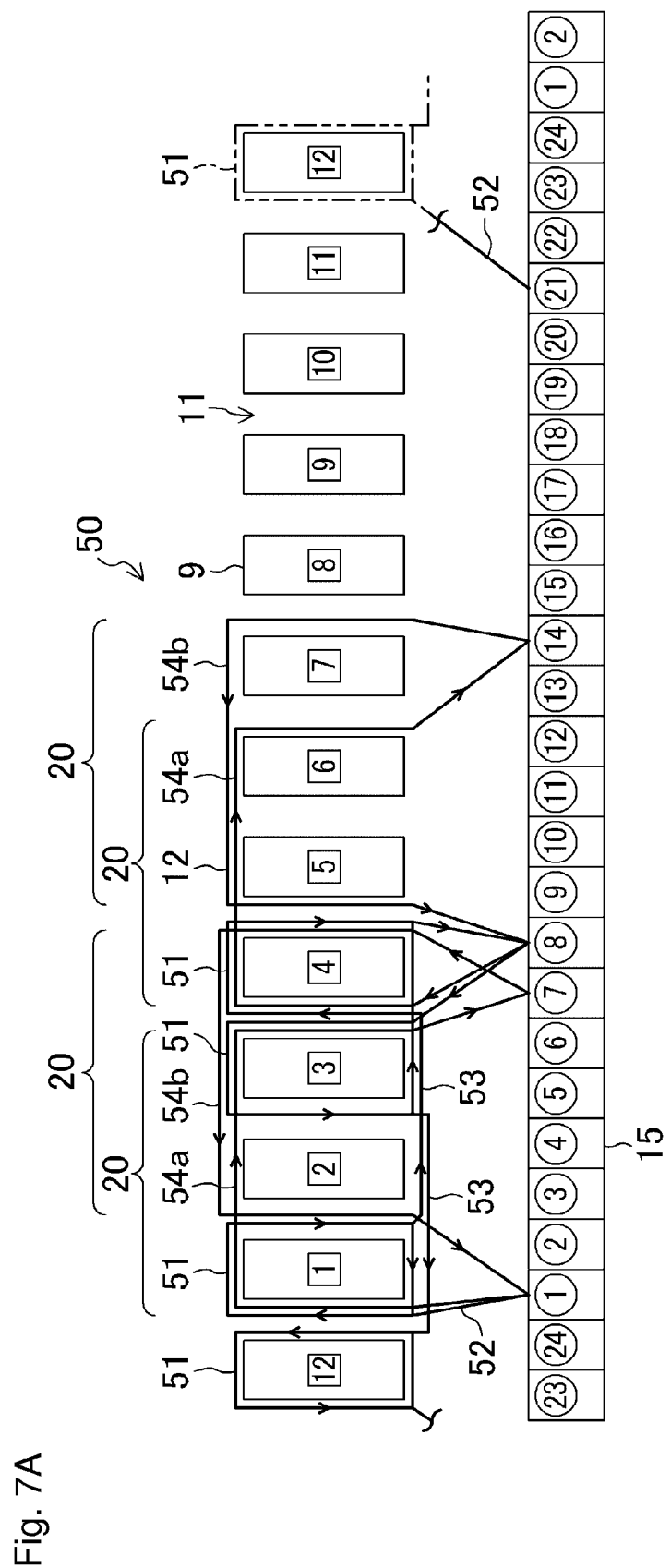

MOTOR

BACKGROUND OF THE INVENTION

1. Field of the Invention

The present invention relates to a motor including a brush, and particularly, to an equalizer structure.

2. Description of the Related Art

For example, an equalizer structure is disclosed in JP 2002-186210A. In JP 2002-186210A, the equalizer is wound around a slot of an armature core and connects commutator pieces having the same potential.

In recent years, advances have been made regarding the miniaturization of motors with brushes. In a small-sized motor with a brush, a concentrated winding structure capable of decreasing a height in an axial direction is used. However, in the concentrated winding structure, in general, there is a need for the number of the magnetic poles of magnets or the number of the brushes to be increased. Taking into consideration costs, sound characteristics, and the like, it is preferable that the number of the brushes is decreased. However, if the number of the brushes is decreased, the current capacity of the equalizer becomes a problem.

This is explained with reference to FIGS. 1A and 1B. In FIGS. 1A and 1B, the reference numeral 101 indicates brushes, 102 indicates segments, 103 indicates coils, and 104 indicates an equalizer. For example, as shown in FIG. 1A, in a case where the brushes 101 directly contact the segments 102 to which the coils 103 supplied with current are connected, even though a plurality of coils 103 is connected to the segments 102 in parallel, a current "i" can be supplied to each coil 103 without difficulty.

However, as shown in FIG. 1B, in a case where the equalizer 104 is used while the number of the brushes is decreased, the total capacity "2i" of the current to be supplied to each coil 103 flows through the equalizer. Thereby, if the current capacity of the equalizer 104 is insufficient, there is a concern that the equalizer 104 may be blown out. With respect to this concern, for example, the following two measures are considered.

(1) As the coils and the equalizer, different conducting wires are used, and diameter of the equalizer is greater than that of the coil.

(2) As the coils and the equalizer, the same conducting wire is used, and the diameter of the equalizer and the diameter of the coils are greater.

However, in measure (1), the connection operation between the coils and the equalizer is increased, whereby there are problems in that an increase in the costs or a decrease in the productivity occurs. In measure (2), a winding process becomes difficult if the diameter of the conducting wire of the coil is increased, and there is a problem in that a decrease in the productivity occurs.

Thus, as a measure to attempt to solve the problems, it is considered that a plurality of lines of equalizers is made. Regarding this measure, in paragraph [0031] of JP 2000-060074A, a structure is disclosed in which two points of segments having the same potential are connected by a plurality of equalizers. Moreover, also in paragraph [0012] of JP 2002-186210A, a structure is disclosed in which two equalizers are wound around between commutator pieces.

However, as in JP 2002-186210A or JP 2000-060074A, if the segments having the same potential are connected by the plurality of equalizers, a loop circuit is formed between the equalizers. In addition, if the equalizers are wound around an armature core, an induced voltage is generated in the equalizers.

If the induced voltage is generated in the equalizers, circulating short-circuit current is generated in the loop circuit, and a decrease in motor efficiency occurs.

SUMMARY OF THE INVENTION

Exemplary preferred embodiments of the present invention provide a motor capable of preventing an occurrence of a short-circuit current even though segments having the same potential are connected by a plurality of equalizers.

A motor according to an exemplary preferred embodiment of the present invention includes an armature, a commutator that includes a plurality of segments, and a shaft that is rotated around a central axis along with the armature and the commutator. In addition, the motor of the exemplary preferred embodiment of the present invention includes a magnet, a brush, and a winding structure. The magnet is disposed around the armature, and an N pole and an S pole are alternatively arranged in a circumferential direction. The brush is disposed around the commutator and makes sliding contact with the segment. The winding structure is disposed over the armature and the commutator.

The armature includes a plurality of coils and an armature core that is fixed to the shaft. The armature core includes a plurality of teeth that are radially extended in a radial direction and a plurality of slots that are disposed between the teeth and extended in an axial direction. The winding structure includes a coil winding wire defining the coil and a leader line that connects between the coil and the segment. In addition, the winding structure includes a connecting wire that is connected between two coils and an equalizer that is connected between two segments. The equalizer is hooked to the tooth through the slot. In addition, the equalizer includes a going portion and a return portion which connect between two of the identical segments.

In addition, a number which becomes an integer is given as an expansion value among values which are integer multiples of the value which is acquired by dividing the number of the slots by the number of pole pairs defined by the N pole and the S pole. In this case, when one group of the teeth, which is arranged so as to be continuous in the circumferential direction and includes the same number as the expansion value, is given as an element teeth group, the going portion and the return portion are hooked to the element teeth group through the slot which is positioned at both sides of the element teeth group.

In addition, in a motor according to an exemplary preferred embodiment of the present invention, the total number of the going portions and the return portions is even, and each of the going portions and the return portions may be hooked to the same teeth through the same slot.

According to the motor according to an exemplary preferred embodiment of the present invention, since the same conducting wire as the coil or the like is used as the conducting wire of the equalizer, the capacity of the equalizer can be secured. In addition, the occurrence of short-circuit current can be prevented.

The above and other elements, features, steps, characteristics and advantages of the present invention will become more apparent from the following detailed description of the exemplary preferred embodiments with reference to the attached drawings.

BRIEF DESCRIPTION OF THE DRAWINGS

FIG. 7A is a diagram showing a winding order of portion (1) in FIG. 6.

DETAILED DESCRIPTION OF THE PREFERRED EMBODIMENTS

Hereinafter, exemplary preferred embodiments of the present invention will be explained in detail with reference to drawings. However, the following explanation is merely exemplary in nature, and the present invention, the applied objects, or the uses are not limited.

Figure 1A:
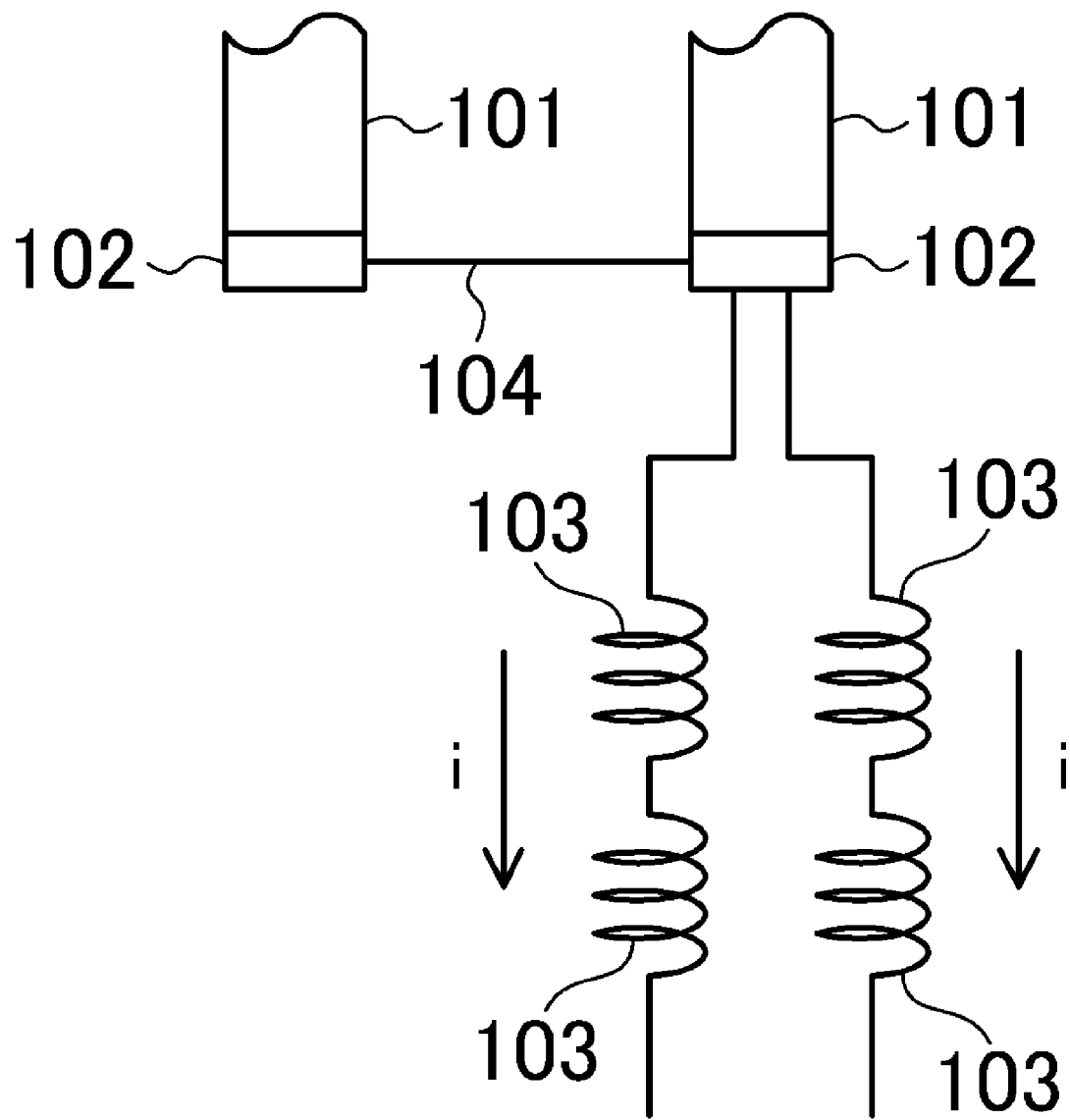
FIGS. 1A and 1B are diagrams explaining a relationship between the number of brushes and a capacity of an equalizer.
Figure 1B:
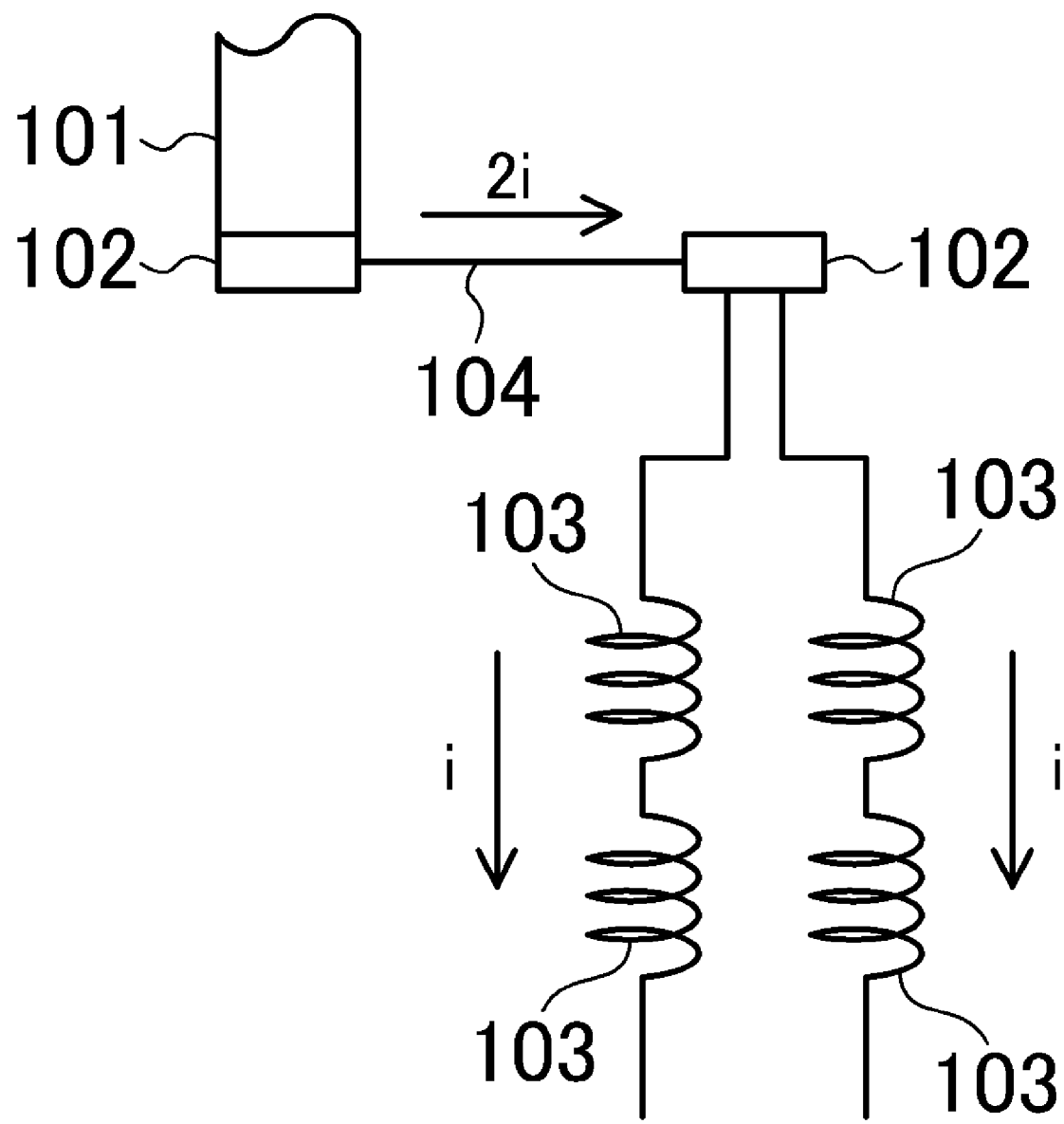
Figure 2:
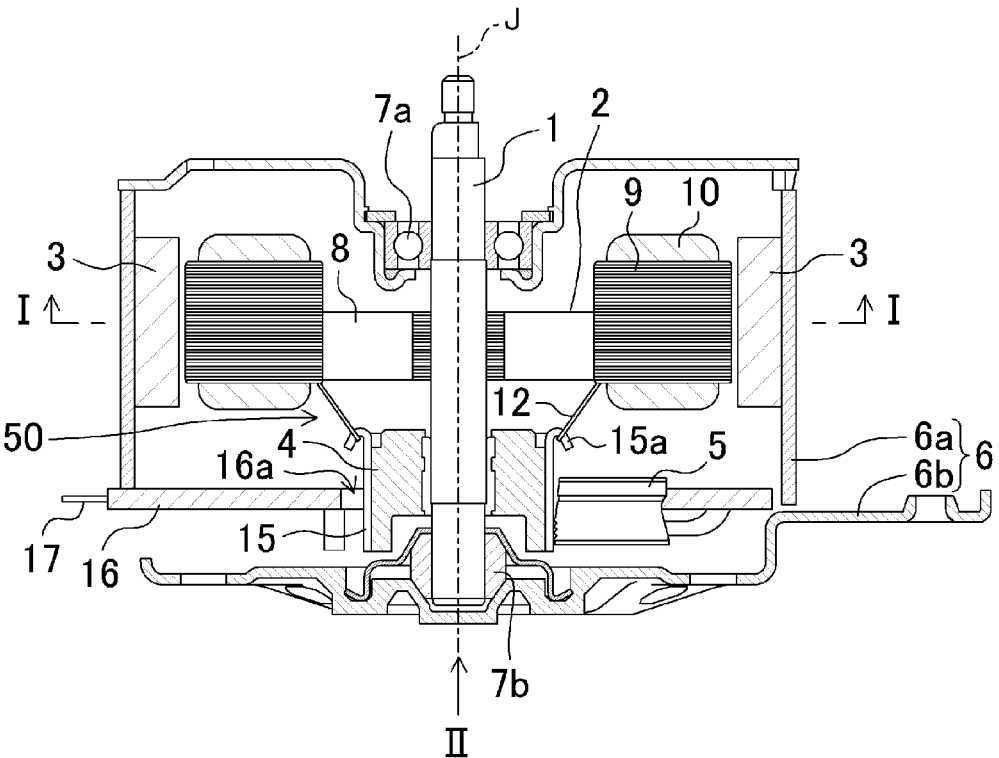
FIG. 2 is a schematic cross-sectional diagram of a motor of an exemplary preferred embodiment of the present invention.
Figure 3:
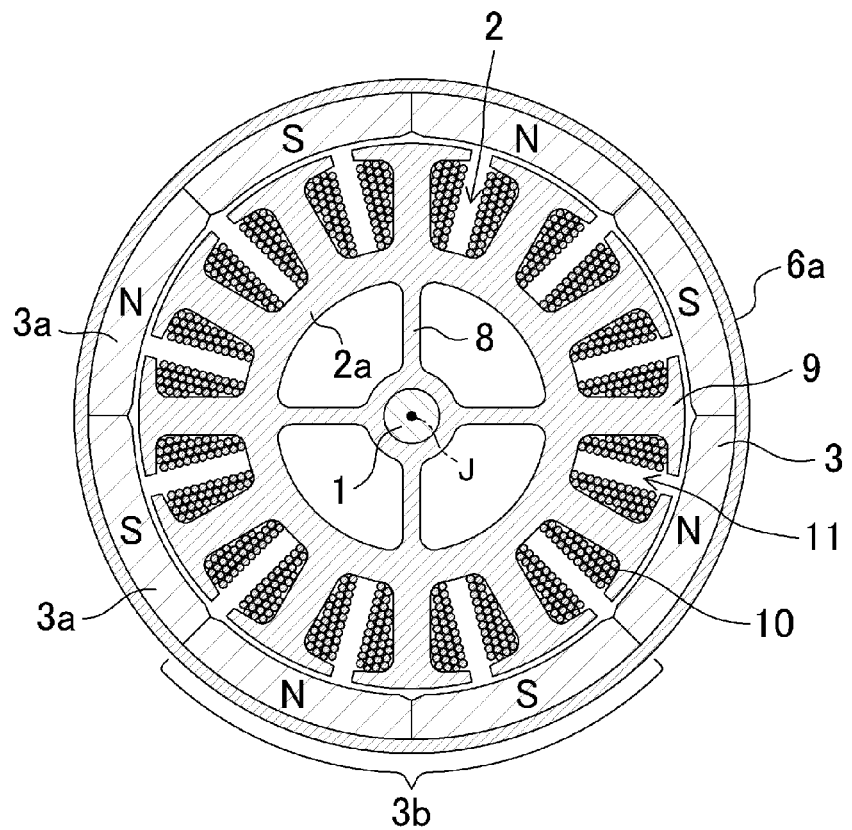
FIG. 3 is a schematic cross-sectional diagram taken along a line I-I of FIG. 2.
Figure 4:
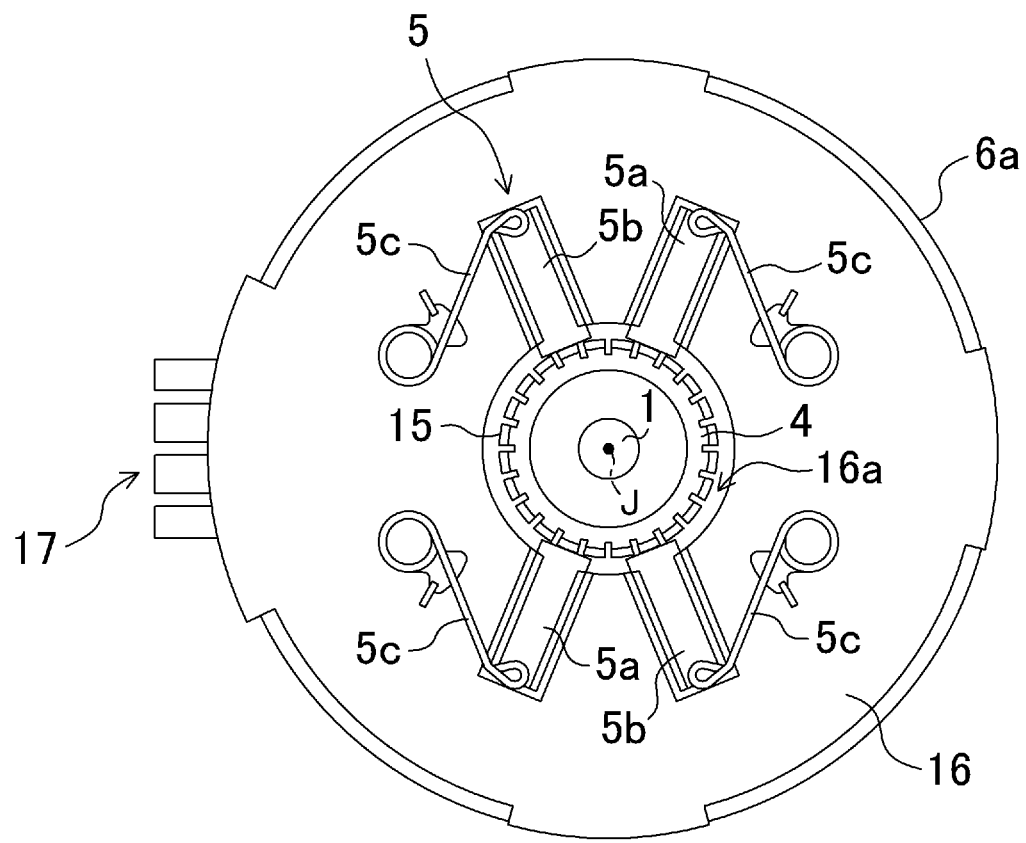
FIG. 4 is a schematic plan diagram when viewed from the direction of an arrow II of FIG. 2 in a state where a back cover has been removed.

FIGS. 2 to 4 show a motor of an exemplary preferred embodiment of the present invention. The motor is preferably a DC motor and includes a shaft 1, an armature 2, a magnet 3, a commutator 4, a brush 5, a housing 6, etc. The components of the shaft 1 and the like are accommodated in the housing 6. A winding structure 50 which is defined by conducting wires 12 is disposed at a portion which ranges from the armature 2 to the commutator 4.

The winding structure 50 preferably includes a coil winding wire 51 defining the coil 10, and a leader line 52 which connects between the coil 10 and a segment 15. In addition, the winding structure 50 preferably includes a connecting wire 53 which connects between two coils 10, and an equalizer 54 which connects between two segments 15. The winding structure 50, particularly, the equalizer 54 will be separately described in detail hereinafter.

As shown in FIG. 2, the housing 6 preferably includes a cylindrical or substantially cylindrical case 6a in which one end is opened, and a back cover 6b which covers an opening of the case 6a. Bearing portions 7a and 7b are preferably provided in the center portion in the axial direction side in each of the case 6a and the back cover 6b. A shaft hole is arranged at the bearing portion 7a.

The shaft 1 is rotatably supported to the housing 6 via the bearing portions 7a and 7b. As a result, the shaft 1 is rotated about a rotation axis J. The one end of the shaft 1 protrudes outside the housing 6 through the shaft hole. The armature 2 and the commutator 4 are fixed to the shaft 1.

In addition, for purposes of explanation, the direction in which the rotation axis J is extended is referred to as an "axial direction", the direction which is perpendicular to or approximately perpendicular to the axial direction in which the rotation axis J extends is referred to as a "radial direction", and the rotation direction of the shaft 1 on the rotation axis J is referred to as a "circumferential direction".

Also as shown in FIG. 3, the armature 2 preferably includes an armature core 2a, the coil 10, and an insulator (not shown) having electrical insulation properties. The armature core 2a is preferably defined by laminating metal plates in the axial direction. The insulator is mounted on the armature core 2a and electrically insulates the armature core 2a and the conducting wire 12.

The armature core 2a preferably includes a center core 8 which is fixed at the intermediate portion in the axial direction of the shaft 1. In addition, the armature core 2a preferably includes a plurality of teeth 9 which are radially extended while having regular or substantially regular intervals from the center core 8 to the outside in the radial direction. As a result, a slot 11 which is extended in the axial direction is defined between two teeth 9 which are adjacent to each other. Accordingly, the armature core 2a includes a plurality of slots 11. In addition, in the present exemplary preferred embodiment, a total number of the teeth 9 and a total number of the slots 11 are both preferably 12.

The coil 10 is preferably provided as a so-called concentrated winding which winds the conducting wire 12 about each tooth 9. The portion of the conducting wire 12 corresponds to the coil winding wire 51. Specifically, the coil 10 is preferably formed by winding the conducting wire 12 around each tooth 9 while passing the conducting wire 12 through each slot 11 which is positioned at both sides in the circumferential direction of the tooth 9. Accordingly, the armature 2 includes a plurality of coils 10. In the present exemplary preferred embodiment, the total number of the coils 10 is preferably 12, for example.

The magnet 3 is annularly disposed around the armature 2. The magnet 3 is preferably fixed to the inner peripheral surface of the case 6a and faces the outer peripheral surface of the armature 2 so as to be separated therefrom with a slight gap. The magnet 3 preferably includes magnetic poles 3a which are defined by a plurality of N poles and a plurality of S poles. In the present exemplary preferred embodiment, the total number of the magnetic poles is preferably 8. Each magnetic pole 3a is disposed so that the N poles and the S poles are alternatively provided in the circumferential direction. Accordingly, a plurality of pole pairs 3b which is defined by the N poles and the S poles is provided in the magnet 3. In the present exemplary preferred embodiment, the total number of the pole pairs is preferably 4, for example. In addition, the magnet 3 may be defined by a plurality of magnets 3. Moreover, the magnet 3 may be provided by polarizing a single magnetic body.

The commutator 4 is adjacent to the armature 2 and fixed to the other end of the shaft 1. The commutator 4 preferably includes a plurality of segments 15 at the outer peripheral surface. In the present exemplary preferred embodiment, the total number of the segments 15 is preferably 24 such that the total number of the segments 15 is two times the number of the slots 11. The segment 15 is preferably a metal member which is a plate-shaped band extended in the axial direction. Each segment 15 is disposed so as to be directly adjacent to two other segments 15 in the circumferential direction in a state of being electrically insulated from each other.

A hook portion 15*a* is preferably provided at the end of the armature 2 side of each segment 15. A conducting wire 12 which is drawn out from the coil 10 is hooked to the hook portion 15*a*. Each segment 15 is electrically connected to the coil 10 by, for example, welding the conducting wire 12 which is hooked to the hook portion 15*a*.

As shown in FIG. 4, the brush 5 is mounted on a brush plate 16. The brush plate 16 is preferably a disk-shaped member. The brush plate 16 is disposed in the housing 6 in a state of being opposite to the inner surface of the housing cover 6*b* in the axial direction. A circular hole 16*a* in which the diameter is greater than the outer diameter of the commutator 4 is arranged so as to be opened in the center portion of the brush plate 16. The commutator 4 is disposed in the inner side of the circular hole 16*a*.

The brush 5 is preferably defined by two positive pole brushes 5*a* and two negative pole brushes 5*b*. Each brush 5*a*, 5*b* is preferably connected to a control device (not shown) or the like via a connecting terminal 17. Each brush 5*a*, 5*b* is disposed around the commutator 4. Each brush 5*a*, 5*b* is pressed to the commutator 4 side from the outside in the radial direction preferably by, for example, a spring 5*c*.

Accordingly, each brush 5*a*, 5*b* always contacts at least one of the segments 15. According to the rotation of the commutator 4, each brush 5*a*, 5*b* periodically makes sliding contact with each segment 15. As a result, electrical current is periodically supplied from the control device or the like to a predetermined coil 10 according to a predetermined order via the brush 5, the segment 15, and winding structure 50.

The winding structure 50 is preferably defined by a single conducting wire 12. That is, the coil winding wire 51, the leader line 52, the connecting wire 53, and the equalizer 54 are preferably a single continuous conducting wire. Specifically, through a dedicated winding device, the conducting wire 12 and a predetermined segment 15 are electrically connected to each other while the conducting wire 12 is hooked to the hook portion 15*a* of the predetermined segment 15. Thereafter, the conducting wire 12 is wound around a predetermined tooth 9 and the winding structure 50 is completed. That is, a plurality of coils 10 is defined by a single conducting wire 12. The leader line 52 which connects between the coil 10 and the segment 15, the connecting wire 53 which connects between two coils 10, and an equalizer 54 which connects between two segments 15 are present between the coils 10.

In this way, since the winding structure 50 is provided by continuously winding a single conducting wire 12, the winding operation is easily performed and productivity is improved.

Figure 5:
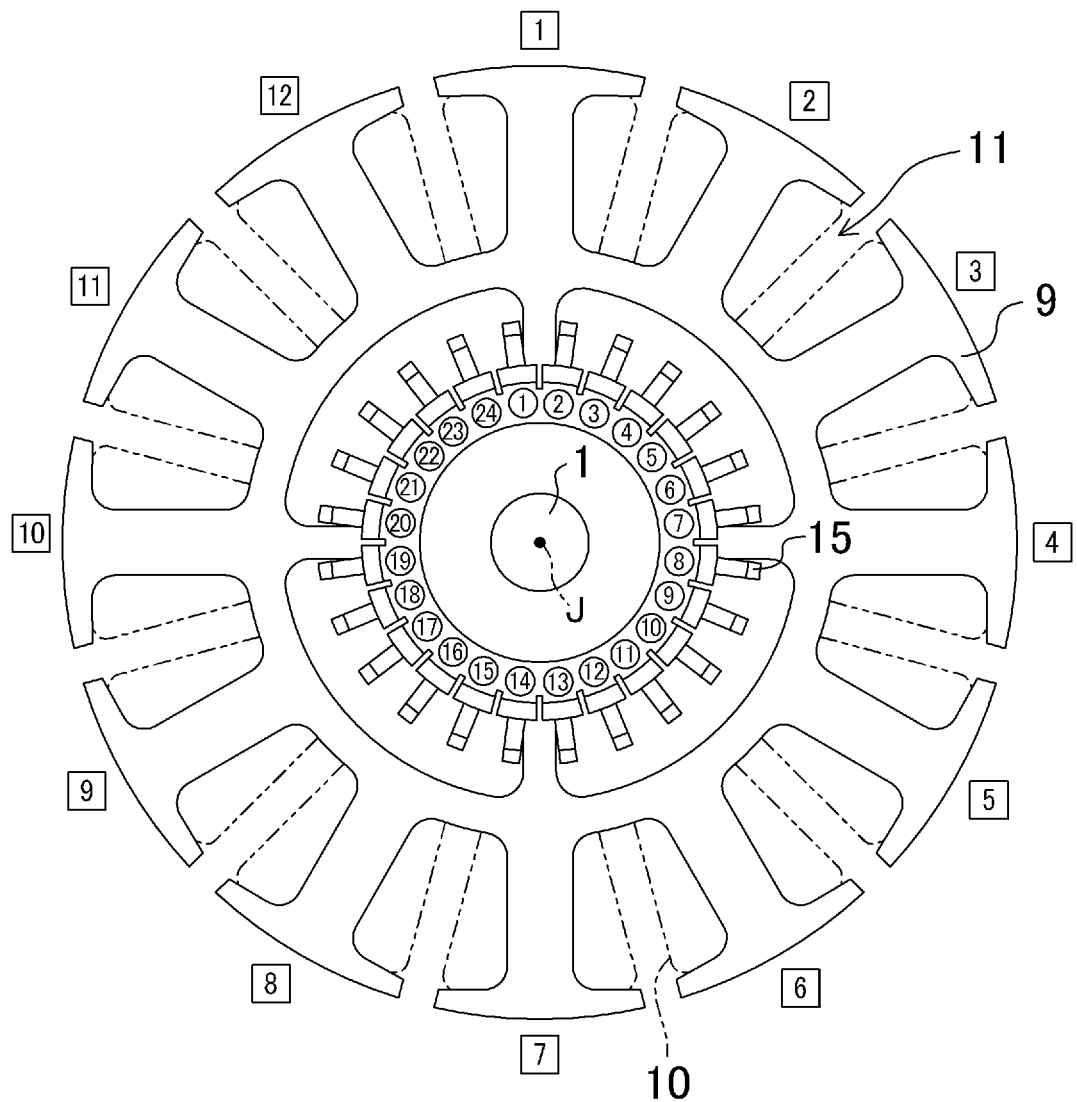
FIG. 5 is a diagram showing a position relationship between teeth or the like and segments in accordance with an exemplary preferred embodiment of the present invention.

The winding structure 50 will be explained in detail based on the disposition of the teeth 9 and the segments 15 shown in FIG. 5. For convenience of explanation, as shown in FIG. 5, numbers are given to each tooth 9 and the coils 10 or the like are distinguished.

Numbers of 1 to 12 from a predetermined tooth 9 in a clockwise direction (CW) are given to each tooth 9 in order such that each tooth 9 is distinguished. Similarly, each coil 10 is also distinguished by the same number as that of the tooth 9 on which the coil 10 is provided. Moreover, each segment 15 is distinguished by being denoted with the numbers of 1 to 24 from a predetermined segment 15 in the vicinity of the tooth 9 denoted with No. 1 in order in a clockwise direction (CW) in the same manner as the tooth 9.

Figure 6:
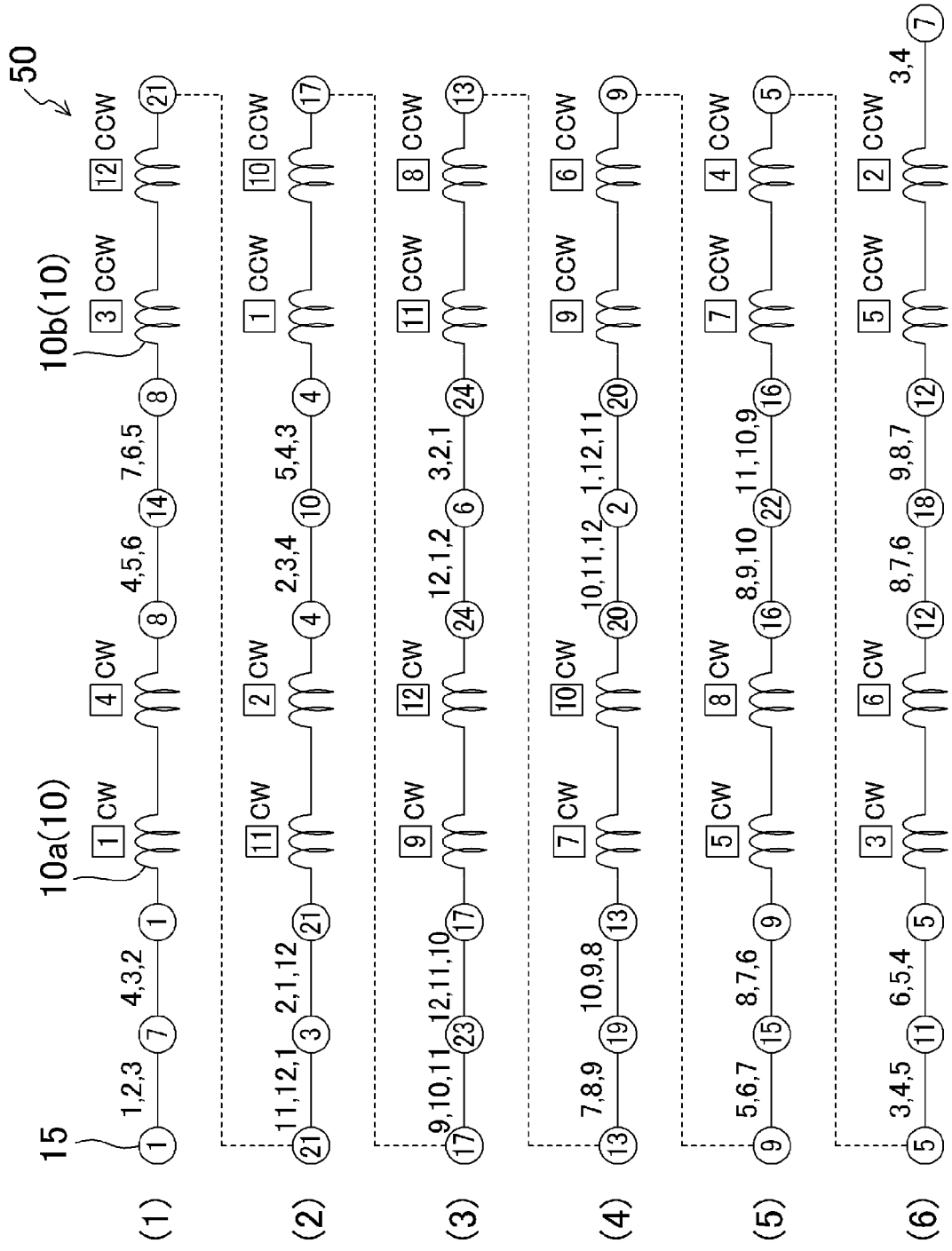
FIG. 6 is a conceptual diagram showing an example of a winding structure in accordance with an exemplary preferred embodiment of the present invention.
Figure 7B:
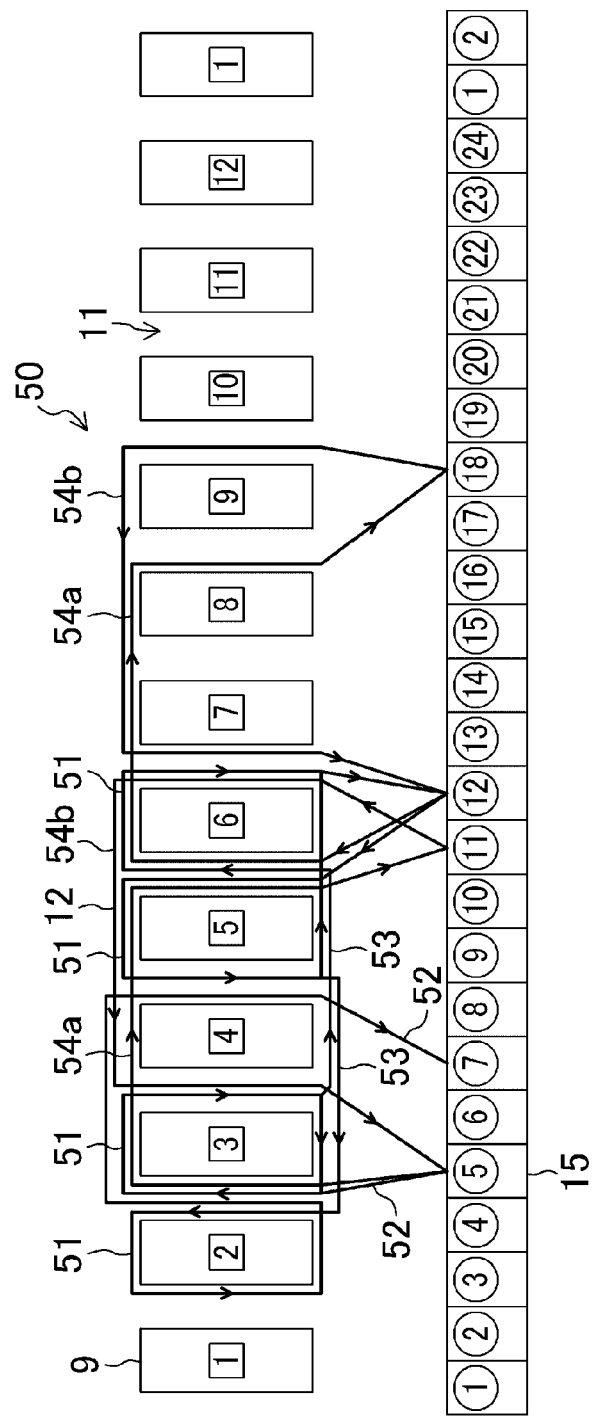
FIG. 7B is a diagram showing a winding order of portion (6) in FIG. 6.

FIG. 6 is a conceptual diagram showing an example of the winding structure 50. Portions (1) to (6) of FIG. 6 simply represent the winding structure 50 in which the winding starts from No. 1 segment 15 and ends at No. 7 segment 15. FIG. 7A shows the winding order in portion (1) in FIG. 6. FIG. 7B shows the winding order in portion (6) in FIG. 6.

As shown in FIG. 6 or 7A, first, the conducting wire 12 having No. 1 segment 15 as the winding start terminal is led out to the side (hereinafter, referred to as the "tooth 9 side") opposite to the commutator 4 in the tooth 9 through the slot 11 between No. 12 tooth 9 and No. 1 tooth 9. Subsequently, the conducting wire 12 is led out to the commutator 4 side in the tooth 9 through the slot 11 between No. 3 tooth 9 and No. 4 tooth 9 across No. 1, No. 2, and No. 3 teeth 9. The led-out conducting wire 12 is hooked to No. 7 segment 15. As a result, No. 1 segment 15 and No. 7 segment 15 are short-circuited. The portion of the conducting wire 12 between the segments defines a going portion 54*a* of the equalizer 54.

The conducting wire 12 which is hooked to No. 7 segment 15 is led out to tooth 9 side through the slot 11 between No. 4 tooth 9 and No. 5 tooth 9. Subsequently, the conducting wire 12 is led out to the commutator 4 side through the slot 11 between No. 2 tooth 9 and No. 1 tooth 9 across No. 4, No. 3, and No. 2 teeth 9. The led-out conducting wire 12 is hooked to No. 1 segment 15 again. As a result, No. 1 segment 15 and No. 7 segment 15 are short-circuited. The portion of the conducting wire 12 between the segments also defines a return portion 54*b* of the equalizer 54.

Next, the conducting wire 12 which is hooked to No. 1 segment 15 is lead out to the tooth 9 side. This portion corresponds to the leader line 52. Thereafter, the conducting wire 12 is wound around No. 1 tooth 9 through the slot 11 between No. 12 tooth 9 and No. 1 tooth 9, and therefore, the coil 10 is provided. The coil 10 is arranged in a clockwise direction (CW) when viewed from the tip side of the tooth 9.

Moreover, after the conducting wire 12 is wound around No. 1 tooth 9 a predetermined number of times, the conducting wire 12 which is led out to the commutator 4 side through the slot 11 between No. 1 tooth 9 and No. 2 tooth 9 is transferred to No. 4 tooth 9 across No. 2 and No. 3 teeth 9. Accordingly, the portion of the conducting wire 12 between the teeth 9 constitutes the connecting wire 53.

Subsequently, the conducting wire 12 is wound around No. 4 tooth 9 through the slot 11 between No. 3 tooth 9 and No. 4 tooth 9, and therefore, the coil 10 is defined. The coil 10 is also provided in a clockwise direction (CW) when viewed from the tip side of the tooth 9. Moreover, after the conducting wire 12 is wound around No. 4 tooth 9 a predetermined number of times, the conducting wire 12 which is led out to the commutator 4 side through the slot 11 between No. 4 tooth 9 and No. 5 tooth 9 is hooked to No. 8 segment 15.

The conducting wire 12 which is hooked to No. 8 segment 15 is led out to the tooth 9 side through the slot 11 between No. 3 tooth 9 and No. 4 tooth 9. Subsequently, the conducting wire 12 is led out to the commutator 4 side through the slot 11 between No. 6 tooth 9 and No. 7 tooth 9 across No. 4, No. 5, and No. 6 teeth 9. The led-out conducting wire 12 is hooked to No. 14 segment 15. As a result, No. 8 segment 15 and No. 14 segment 15 are short-circuited. The portion of the conducting wire 12 between the segments defines a going portion 54*a* of the equalizer 54.

The conducting wire 12 hooked to No. 14 segment 15 is led out the tooth 9 side through the slot 11 between No. 7 tooth 9 and No. 8 tooth 9. Subsequently, the conducting wire 12 is led out to the commutator 4 side through the slot 11 between No.

5 tooth 9 and No. 4 tooth 9 across No. 7, No. 6, and No. 5 teeth 9. The led-out conducting wire 12 is hooked to No. 8 segment 15 again. As a result, No. 8 segment 15 and No. 14 segment 15 are short-circuited. The portion of the conducting wire 12 between the segments also defines a return portion 54b of the equalizer 54.

Next, the conducting wire 12 which is hooked to No. 8 segment 15 is wound around No. 3 tooth 9 through the slot 11 between No. 3 tooth 9 and No. 4 tooth 9, and therefore, the coil 10 is provided. The coil 10 is arranged in a counterclockwise direction (CCW) when viewed from the tip side of the tooth 9.

Moreover, after the conducting wire 12 is wound around No. 3 tooth 9 a predetermined number of times, the conducting wire 12 is led out to the commutator 4 side through the slot 11 between No. 2 tooth 9 and No. 3 tooth 9. Thereafter, the conducting wire 12 is transferred to No. 12 tooth 9 across No. 2 and No. 1 teeth 9. The portion of the conducting wire 12 between the teeth 9 defines the connecting wire 53.

Subsequently, the conducting wire 12 is wound around No. 12 tooth 9 through the slot 11 between No. 1 tooth 9 and No. 12 tooth 9, and therefore, the coil 10 is completed. The coil 10 is also arranged in a counterclockwise direction (CCW) when viewed from the tip side of the tooth 9. Moreover, after the conducting wire 12 is wound around No. 12 tooth 9 a predetermined number of times, the conducting wire 12 which is led out to the commutator 4 side through the slot 11 between No. 11 tooth 9 and No. 12 tooth 9 is hooked to No. 21 segment 15.

According to the above-described process, the winding structure 50 of portion (1) in FIG. 6 is provided.

Thereafter, the winding structure 50 shown in portions (2) to (5) in FIG. 6 is provided by being processed through the same method. That is, No. 1 segment 15 which is the winding start terminal replaces No. 21, No. 17, No. 13, or No. 9 segment 15, and the relative positional relationship of the other each segment 15 or each tooth 9 is also replaced. Simply by doing this, the conducting wire 12 is wound according to the same order as that of the above-described portion (1) of FIG. 6.

In portion (6) in FIG. 6, only the processing of the winding end terminal is different from the other portions such as portion (1), the other processing content is the same as that of portion (1) or the like. Specifically, the conducting wire 12 is wound around No. 2 tooth a predetermined number of times and the counterclockwise coil 10 is provided. Thereafter, the conducting wire 12 is led out to the tooth 9 side through the slot 11 between No. 2 tooth 9 and No. 3 tooth 9. The led-out conducting wire 12 is led out to the commutator 4 side again through the slot 11 between No. 4 tooth 9 and No. 5 tooth 9 across No. 3 and No. 4 teeth 9.

Finally, the led-out conducting wire 12 is hooked to No. 7 segment 15 and becomes the winding end terminal.

Two kinds of coils 10 are preferably wound around each tooth 9 of the winding structure 50. That is, the clockwise (CW) element coil 10a and the counterclockwise (CCW) element coil 10b, which are two kinds of coils 10 wound in opposite directions, are arranged on each of the teeth 9 when viewed from the tip side of the tooth 9. Due to the fact that the coils 10 are defined in this way, motor performance can be improved. Specifically, the generation of sparks can be prevented, and the life span of the motor can be improved.

To explain this point in detail, generally, in the motor with brushes, electrical current is supplied to the armature through brushes which make sliding contact with the rotating commutator, and the motor is rotated. At this time, there is a concern that sparking discharge, that is, sparks may be generated between the brush and the commutator. Specifically, when the segment which makes sliding contact with the brush is replaced, since the direction in which current flows is reversed in a very short time, a so-called surge voltage is generated in proportion to the rapid change of the current due to inductance of the coil. Sparking is generated by effects such as the surge voltage. If the sparking is generated, life span of the brush is shortened, and life span of the motor is decreased.

In contrast, in the motor with the brush of the present exemplary preferred embodiment, each coil 10 is defined by two kinds of element coils 10a and 10b. Moreover, electrical current is supplied to each element coil 10a, 10b at regular intervals through the positive pole brush 5a and the negative pole brush 5b, the current supplied to each element coil 10a, 10b is set so at to flow in the same winding direction.

In addition, the positive pole brush 5a and the negative pole brush 5b are disposed so that a supply timing of the current to the element coils 10a and 10b is deviated. If the supply timing of the current to the element coils 10a and 10b of each coil 10 is deviated, the rate of change of the current at the time of replacing the segment is decreased. As a result, the generation of sparks is effectively suppressed or prevented, and the life span of the motor can be improved.

In addition, even though the winding direction of each of a plurality of kinds of coils 10 which is arranged on single tooth 9 is the same direction, similar effects can be obtained by adjusting the flow of current to be supplied. That is, it is sufficient if the winding structure 50 has a structure in which a plurality of kinds of coils 10 is arranged on a single tooth 9 and the conducting wire 12 defining each coil 10 is hooked to the segments 15 which are different to each other.

Moreover, in order to improve motor performance, wiring of the equalizer 54 is considered.

In the first place, the equalizer 54 which connects between two identical segments 15 is configured as a plurality. Specifically, the equalizer 54 includes the going portion 54a and the return portion 54b which go and return between two identical segments 15. As a result, since current capacity of the equalizer 54 can be secured even though the conducting wire 12 such as the coil 10 is used, the number of the brushes can be decreased. In addition, the total number of the going portions 54a and the return portions 54b need not necessarily be two, and may be 3 or more.

Secondly, the going portion 54a and the return portion 54b are preferably disposed under a predetermined condition. That is, among values which are integer multiples of the value which is acquired by dividing the number of the slots 11 by the number of pole pairs 3b, the number which becomes the integer is given as the expansion value. Moreover, in this case, a group of teeth 9, which is arranged so as to be continually provided in the circumferential direction and including the same number as the expansion value, is given as the element teeth group. At this time, the going portion 54a and the return portion 54b are disposed so that the going portion 54a and the return portion 54b are wound across the element teeth group through the slot positioned at both sides of the element teeth group. The winding structure 50 is referred to as a "first winding structure 50".

For example, in a case of motor having 8 poles and 10 slots, the number of the slots 11 is preferably 10 and the number of the pole pairs 3b is preferably 4. Accordingly, the value acquired by dividing 10 which is the number of the slots 11 by 4 which is the number of the pole pairs 3b is 2.5. Moreover, among the values which are integer multiples of 2.5, the numbers which become integers are 5, 10, and the like. Therefore, the expansion value becomes a multiple of 5.

In the present exemplary preferred embodiment, the number of the slots 11 is preferably 12 and the number of the pole pairs 3$b$ is preferably 4, for example. Accordingly, the value acquired by dividing 12, which is the number of the slots 11, by 4, which is the number of the pole pairs 3$b$, is 3. Moreover, among the values which are integer multiple of 3, the numbers which become integers are 3, 6, or the like. Therefore, the expansion value becomes a multiple of 3.

In this way, there is a case where the number of the slots 11 is not an integer multiple of the number of the pole pairs 3$b$ and a case where the number of the slots 11 is an integer multiple of the number of the pole pairs 3$b$. However, as in the present exemplary preferred embodiment, it is preferable that the number of the slots 11 is an integer multiple of the number of the pole pairs 3$b$. As a result of dividing the number of the slots 11 by the number of pole pairs 3$b$ without a remainder, the minimum value of the expansion value is decreased. Therefore, an effective winding structure 50 can be provided.

Moreover, the going portion 54$a$ and the return portion 54$b$ are wound across the group of teeth 9 through slots 11 which are positioned at both sides in the circumferential direction of a group of teeth 9, that is, a so-called element teeth group which is arranged so as to be continued with the same number as the expansion value. In addition, according to the present exemplary preferred embodiment, the same number as the expansion value is 3 n.

Figure 8:
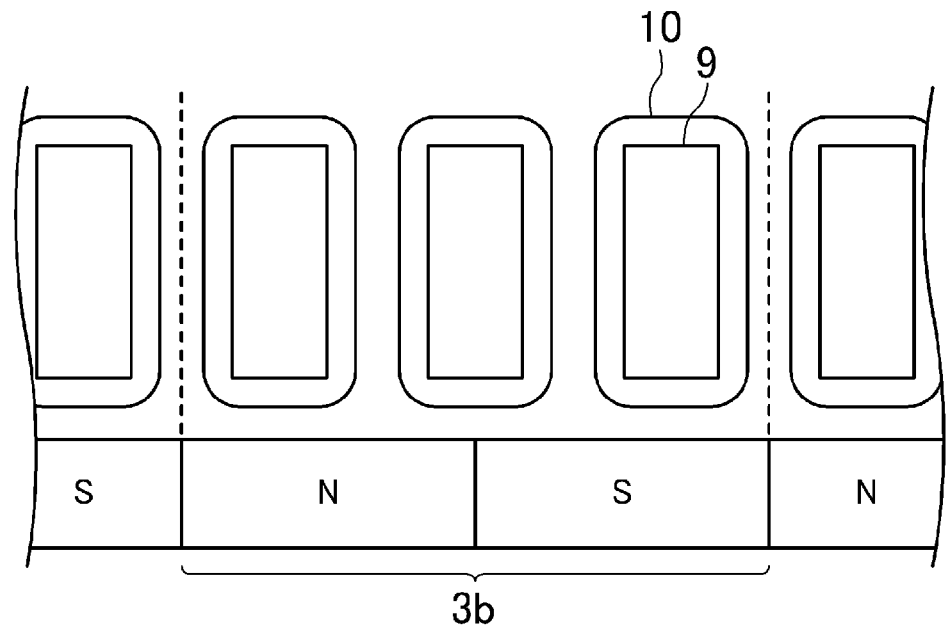
FIG. 8 is a diagram explaining a first winding structure in accordance with an exemplary preferred embodiment of the present invention.

For example, according to the present exemplary preferred embodiment, as shown in FIG. 8, one pole pair 3$b$ always has a relationship which faces the portion of three teeth 9, even when the motor is rotated, the relationship is not changed only by deviation of the positional relationship between one pole pair 3 and the portion of three teeth 9. Accordingly, the circuit (coil) of the going portion 54$a$ or the return portion 54$b$ which are wound across the element teeth group always faces the portion of an integer multiple of the pole pair 3$b$. As a result, since induced voltage is not generated in each circuit of the going portion 54$a$ and the return portion 54$b$, short-circuit current does not flow in each circuit of the going portion 54$a$ and the return portion 54$b$. Accordingly, in the loop circuit which is defined by the going portion 54$a$ and the return portion 54$b$, the circulating short-circuit current does not flow. As a result, the motor performance is improved. Moreover, since induced voltage is not generated in each circuit of the going portion 54$a$ and the return portion 54$b$, there is no effect on the voltage which is supplied through the brushes. As a result, a loss of motor performance is not generated.

The going portion 54$a$ and the return portion 54$b$ may be wound across the same element teeth group. However, as in the present exemplary preferred embodiment, it is preferable that the going portion 54$a$ and the return portion 54$b$ are wound across different element teeth groups. In doing so, since the draw-in direction and the draw-out direction of the conducting wire 12 with respect to the hook portion 15$a$ are different to each other, the conducting wire 12 can be easily hooked to the hook portion 15$a$. As a result, productivity is improved.

According to the present exemplary preferred embodiment, as shown by the reference numeral 20 in FIG. 7A, the element teeth group is preferably provided by three teeth 9 of No. 1 to No. 3, three teeth 9 of No. 2 to No. 4, three teeth 9 of No. 4 to No. 6, three teeth group 9 of No. 5 to No. 7, and the like. The number of the teeth 9 defining the element teeth group may be different in the going portion 54$a$ and the return portion 54$b$.

However, in some cases, the equalizer 54 can be wired under the above-described condition due to the specifications of the motor or the like.

For example, if the motor has 8 poles and 10 slots, it is preferable that the equalizer 54 is wound across one group of 5 or 10 teeth 9. However, for example, in some cases, the equalizer 54 needs be wound across one group of 4 or less teeth 9. In this case, the following is preferable. That is, the total number of the going portions 54$a$ and the return portions 54$b$ is even, and each of the going portions 54$a$ and the return portions 54$b$ is wired so as to be wound across one group of the same teeth 9 through the same slot 11. This winding structure 50 is referred to as a second winding structure 50.

Figure 9:
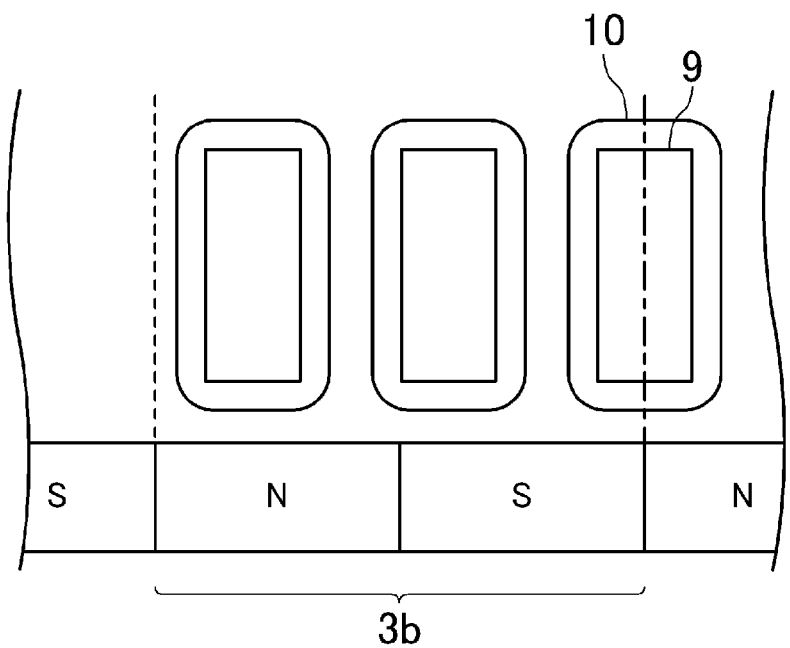
FIG. 9 is a diagram explaining a second winding structure in accordance with an exemplary preferred embodiment of the present invention.

This will be explained with reference to FIG. 9, and the motor having 8 poles and 10 slots will be used as a non-limiting example. In this case, one pole pair 3$b$ always faces 2.5 pieces of the teeth 9. Accordingly, in the case where the going portion 54$a$ and the return portion 54$b$ are wound across one group of two teeth 9, one pole pair 3$b$ partially faces the circuit which is provided by the going portion 54$a$ and the return portion 54$b$. In addition, in the case where the going portion 54$a$ and the return portion 54$b$ are wound across one group of 3 or 4 teeth 9, the circuit which is provided by the going portion 54$a$ and the return portion 54$b$ partially faces one pole pair 3$b$. As a result, induced voltage is generated in each circuit of the going portion 54$a$ and the return portion 54$b$ by rotation of the motor.

Accordingly, if phase deviation is generated in the induced voltages which are respectively generated between the circuit provided by the going portion 54$a$ and the circuit provided by the return portion 54$b$, circulating short-circuit current is generated in the loop circuit provided by the going portion 54$a$ and the return portion 54$b$. As a result, a brake force is generated.

Therefore, the going portion 54$a$ and the return portion 54$b$ are arranged so as to be a pair of circuits which reciprocate to be wound across one group of the same teeth 9. If the going portion 54$a$ and the return portion 54$b$ are the path which is wound across one group of the same teeth 9, the number of the teeth 9 which the going portion 54$a$ and the return portion 54$b$ straddle is not considered. That is, if the going portion 54$a$ and the return portion 54$b$ are the path which is wound across one group of the same teeth 9, the number of the teeth 9 covered by the going portion 54$a$ and the return portion 54$b$ may be 1 or more. As a result, the induced voltages generated in both circuits always become the same phase, the circulating short-circuit current does not flow in the loop circuit which is provided by the going portion 54$a$ and the return portion 54$b$. As a result, the motor performance is improved. Moreover, at this time, the equalizer 54 reciprocates a plurality of times and is wound across one group of the same teeth 9, and a plurality of going portions 54$a$ and return portions 54$b$ may be respectively provided.

With respect to the effects of the above-described first winding structure 50 (exemplary preferred embodiment 1) and second winding structure 50 (exemplary preferred embodiment 2), the following confirmation tests were performed.

Figure 10:
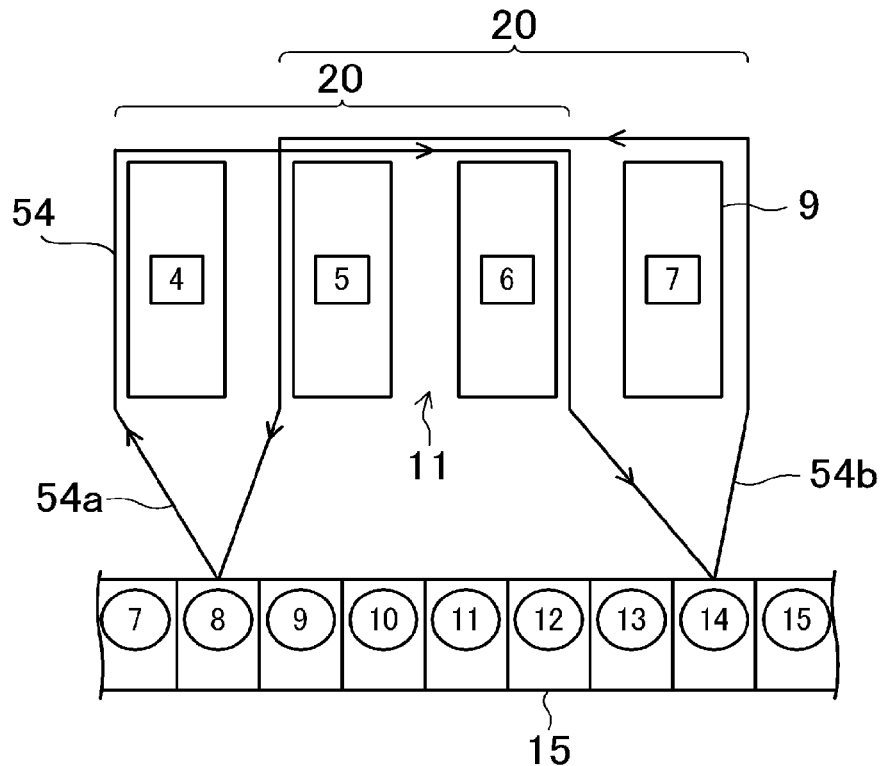
FIG. 10 is a diagram showing a basic configuration of an equalizer of exemplary preferred embodiment 1 of the present invention.
Figure 11:
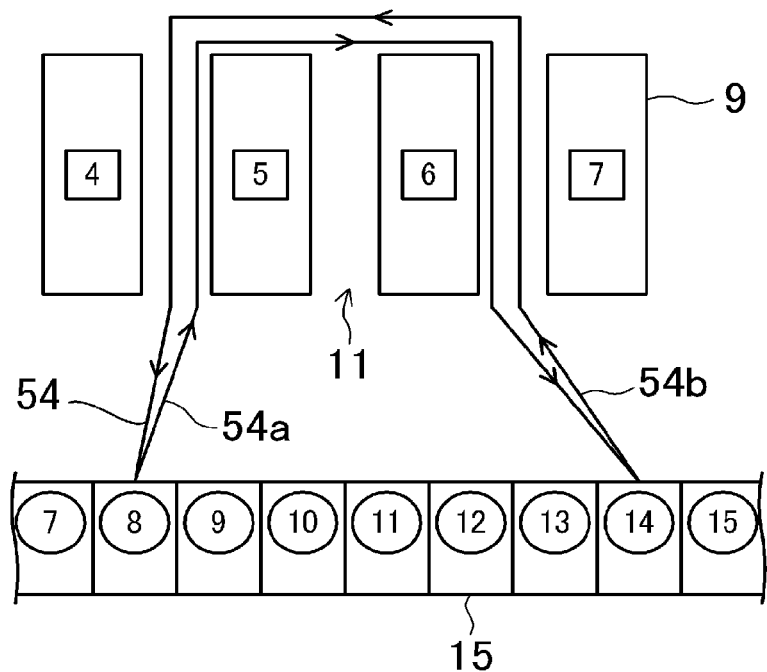
FIG. 11 is a diagram showing a basic configuration of an equalizer of exemplary preferred embodiment 2 of the present invention.
Figure 12:
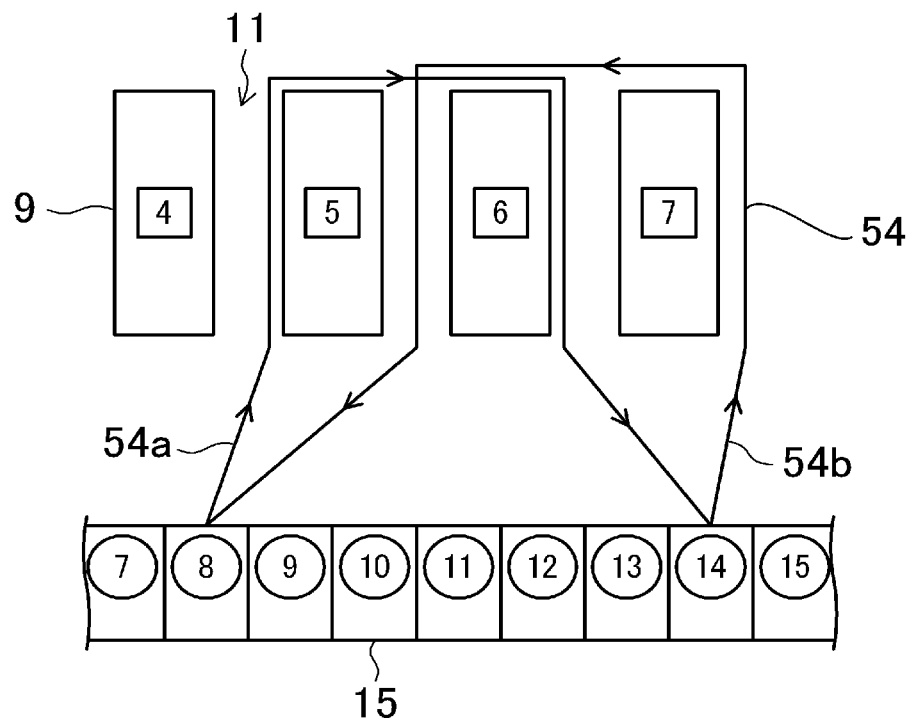
FIG. 12 is a diagram showing a basic configuration of an equalizer of a comparative example.

The exemplary preferred embodiment 1 is the motor which includes 8 poles and 12 slots of the first winding structure in the above-described exemplary preferred embodiment. The basic configuration of the equalizer 54 is shown in FIG. 10. Exemplary preferred embodiment 2 is the motor which includes 8 poles and 10 slots of the second winding structure in the above-described exemplary preferred embodiment. In the exemplary preferred embodiment 2, the going portion 54$a$ and the return portion 54$b$ are each wound around for each one across one group of the teeth which are defined by two teeth. The basic configuration of the equalizer 54 is shown in FIG. 11. As a comparative example, in the motor of the exemplary preferred embodiment 2, a test was performed with respect to a case where the circuit of the going portion 54a and the return portion 54b is provided through different paths. The basic configuration of the equalizer 54 is shown in FIG. 12.

Figure 13:
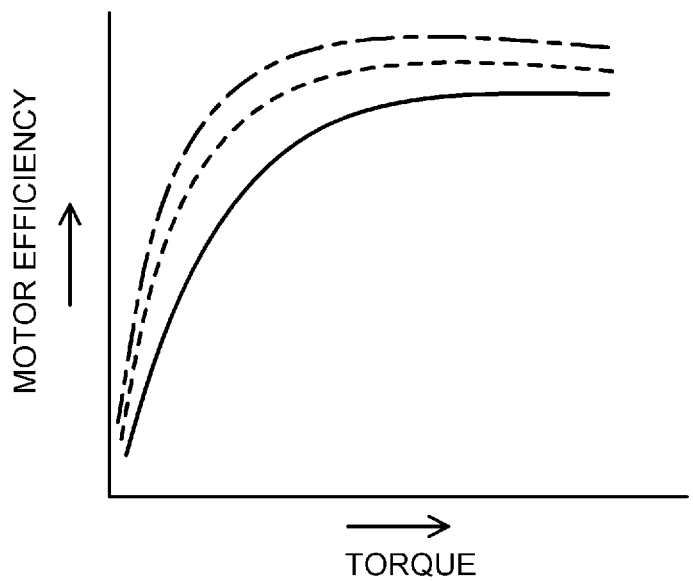
FIG. 13 is a graph showing results of confirmation tests in accordance with an exemplary preferred embodiment of the present invention.

The results of the confirmation tests which were collected with respect to the relationship between the motor efficiency and torque in the exemplary preferred embodiment 1 or the like are shown in FIG. 13. In FIG. 13, an alternate long and short dash line represents the exemplary preferred embodiment 1, a broken line represents the exemplary preferred embodiment 2, and a solid line represents the comparative example.

It was observed that the motor efficiency of the exemplary preferred embodiments 1 and 2 is improved compared to that of the comparative example. Among them, the motor efficiency of the exemplary preferred embodiment 1 is higher as a whole than that of the exemplary preferred embodiment 2, and it was observed that the exemplary preferred embodiment 1 is particularly effective.

Only selected exemplary preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the exemplary preferred embodiments according to the present invention is provided for illustration only, and not for limiting the present invention as defined by the appended claims and their equivalents.

Figure 14:
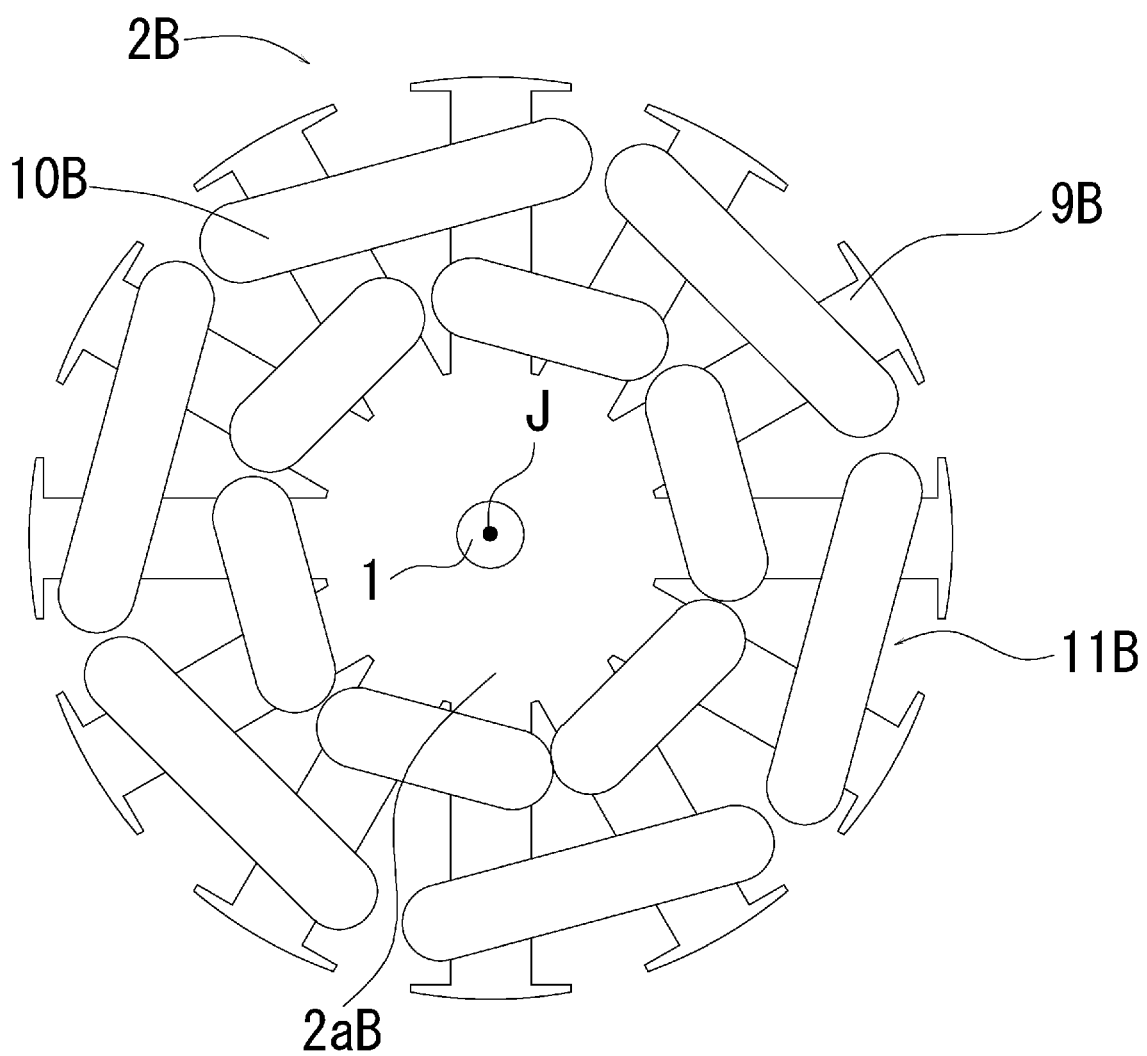
FIG. 14 is a diagram showing a core with a distributed winding in accordance with an exemplary preferred embodiment of the present invention.

For example, the winding method in the coil of the motor is not limited to the concentrated winding, and a distributed winding may be applied. That is, the coil 10 may be defined by winding the coil winding wire 51 around a plurality of teeth 9. FIG. 14 shows an example of a preferred embodiment of the present invention which includes a coil 10B that has been wound, in a distributed manner, around teeth 9B of a core 2B of an armature 2aB including slots 11B. In addition, the winding structure 50 is preferably provided by using single conducting wire 12. However, the winding structure 50 may be provided by using a plurality of conducting wires 12.

For example, the motor of the exemplary preferred embodiments of the present invention is suitable for a motor which is mounted on vehicle.

While exemplary preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising: an armature;
a commutator that includes a plurality of segments;
a shaft that is rotated around a central axis along with the armature and the commutator;
a magnet that is disposed around the armature and in which an N pole and an S pole are alternatively arranged in a circumferential direction;
a brush that is disposed around the commutator and makes sliding contact with the plurality of segments; and
a winding structure that is disposed over the armature and the commutator;
wherein the armature includes a plurality of coils, and an armature core that is fixed to the shaft;
the armature core includes a plurality of teeth that are radially extended in a radial direction, and a plurality of slots that are disposed between the plurality of teeth and extended in an axial direction;
the winding structure includes a coil winding wire that defines the coil, a leader line that is connected between the coil and the plurality of segments, a connecting wire that is connected between two coils, and an equalizer that is connected between two segments of the plurality of segments;
the equalizer includes a going portion and a return portion which are wound across groups of the plurality of teeth through the plurality of slots, and connects a hook portion of two identical segments of the plurality of segments; and
when an expansion value is an integer among values which are integer multiples of a value which is acquired by dividing a total number of the slots by a total number of pole pairs defined by the N pole and the S pole, and when one group of the plurality of teeth continuously arranged in the circumferential direction and includes a same number of the plurality of teeth as the expansion value is given as an element teeth group, the plurality of teeth forming a plurality of element teeth groups, the going portion and the return portion are wound across the element teeth groups through ones of the plurality of slots positioned at both sides of the element teeth groups;
the element teeth group covered by the going portion is different from the element teeth group covered by the return potion; and
the coil winding wire, the leader line, the connecting wire, and the equalizer are all portions of a single continuous conducting wire.

2. The motor according to claim 1,
wherein the total number of the plurality of slots is an integer multiple of the total number of the pole pairs.

3. The motor according to claim 1,
wherein the coil is a distribution winding in which the coil winding wire is wound over more than one of the plurality of teeth.

4. The motor according to claim 1,
wherein the coil is a concentration winding in which the coil winding wire is wound for each tooth of the plurality of teeth.

5. The motor according to claim 4,
wherein each coil is defined by two kinds of element coils, including a clockwise element coil and a counterclockwise element coil, are wound around each of the plurality of teeth; and
a total number of the plurality of segments is double that of the total number of the plurality of slots.

* * * * *